(No Model.)  
3 Sheets—Sheet 3.
A. SAMPSON.
HORSE POWER.
No. 388,586. Patented Aug. 28, 1888.
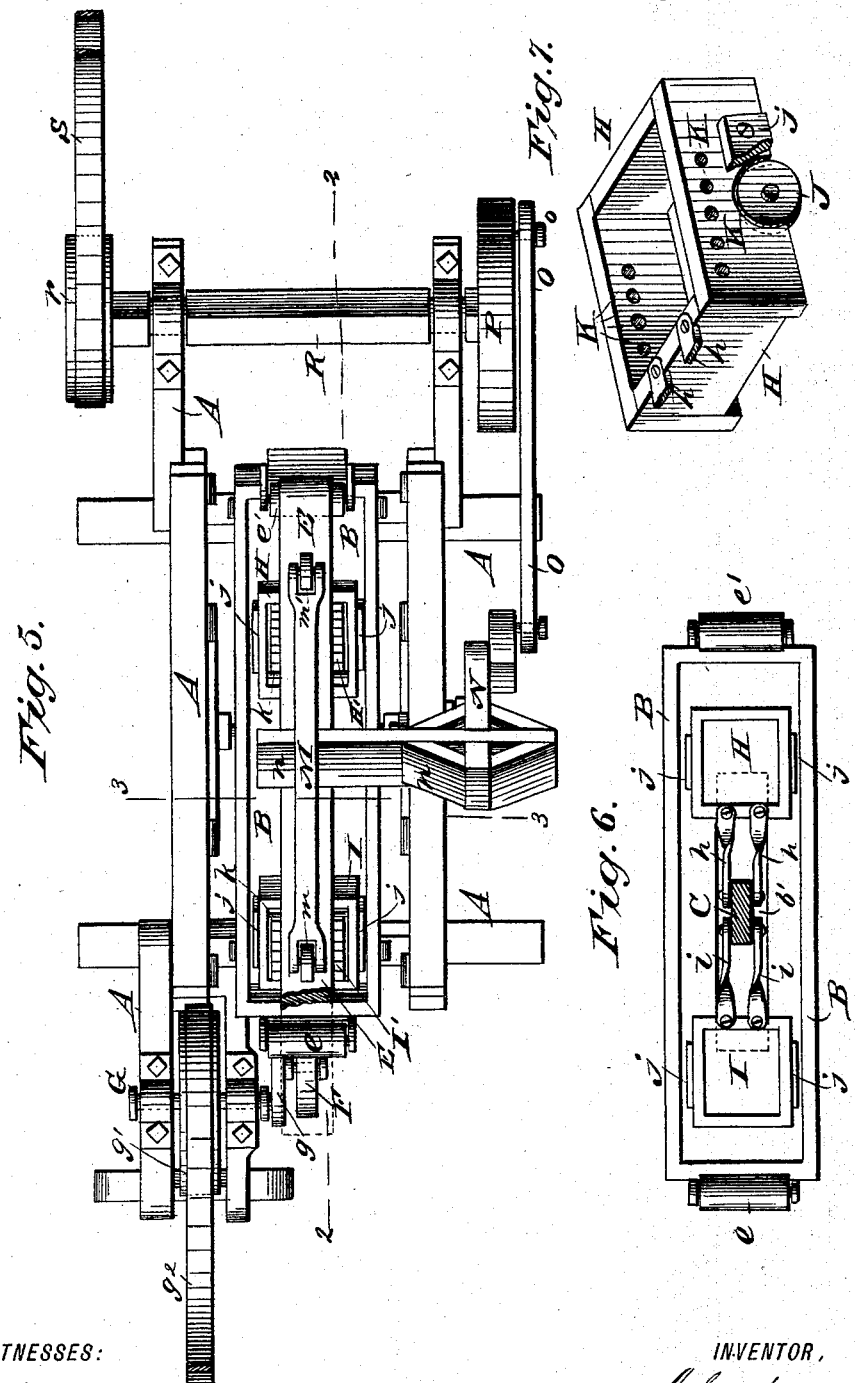
WITNESSES:  
Phil C. Dieterich  
C. Sedgwick
INVENTOR,  
A. Sampson  
BY Munn & Co  
ATTORNEY.

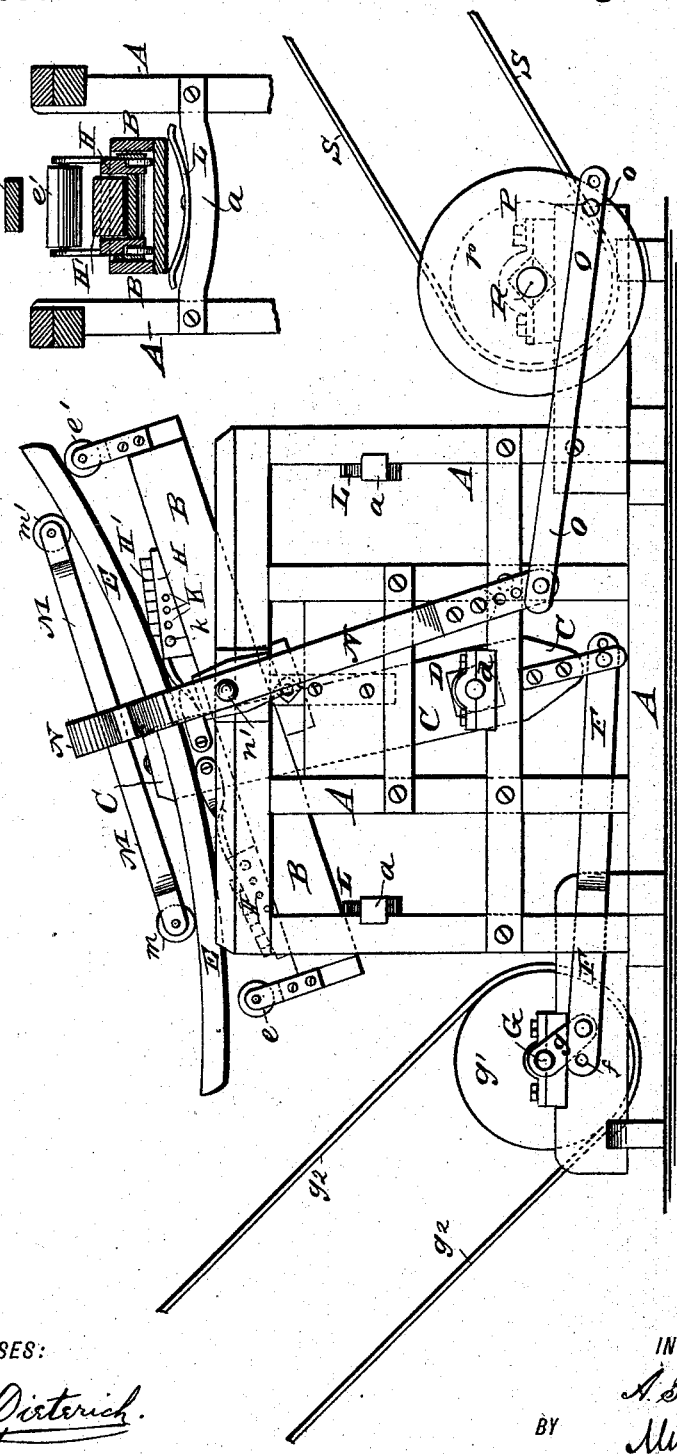

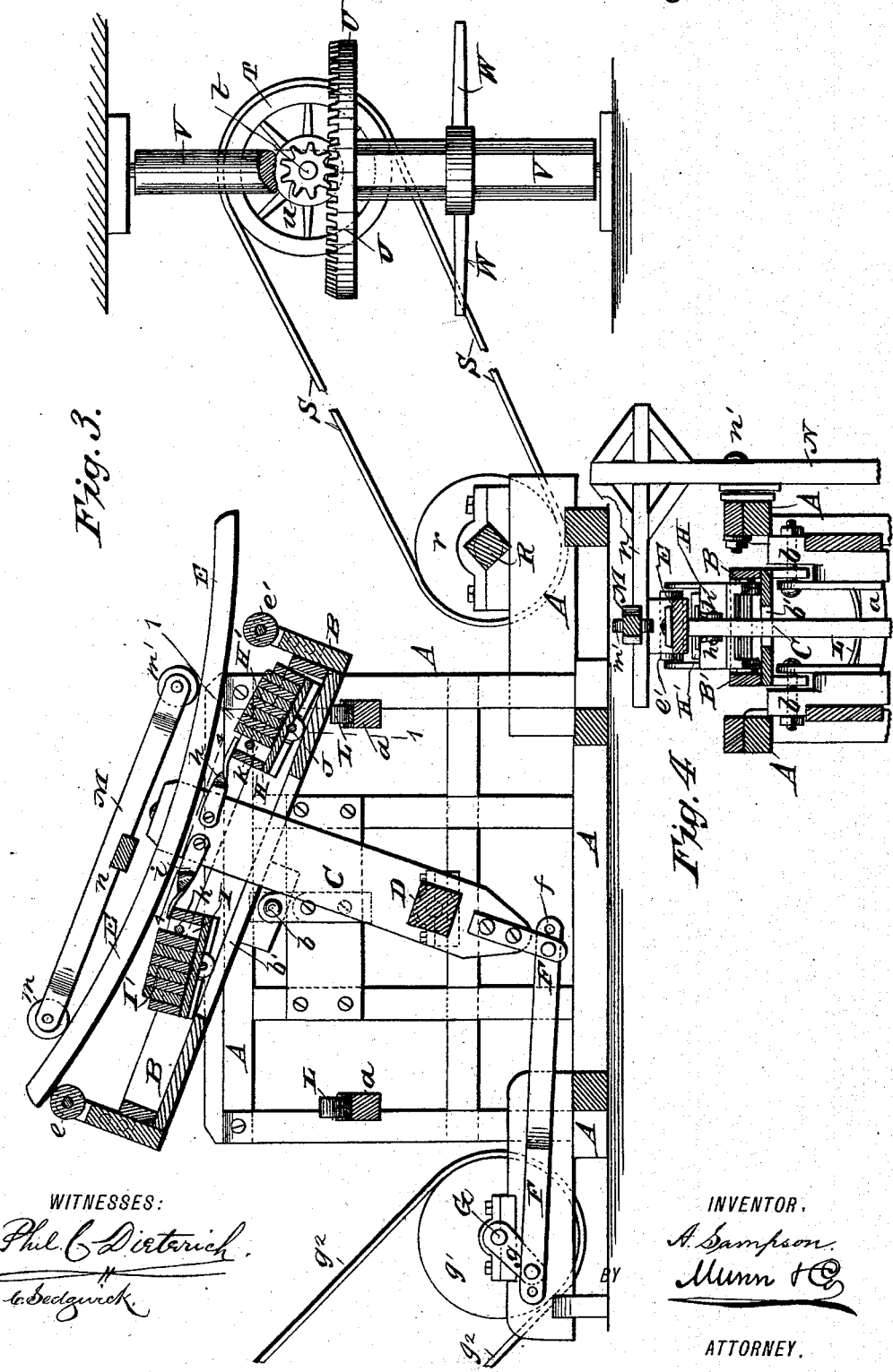

United States Patent Office.

ALLEN SAMPSON, OF VICTORIA, TEXAS.

HORSE-POWER.

SPECIFICATION forming part of Letters Patent No. 388,586, dated August 28, 1888.

Application filed May 29, 1888. Serial No. 275,419. (No model.)

*To all whom it may concern:*

Be it known that I, ALLEN SAMPSON, of Victoria, in the county of Victoria and State of Texas, have invented a new and Improved Horse-Power, of which the following is a full, clear, and exact description.

My invention relates to a machine adapted for operation from an auxiliary motor actuated by horse or animal power, and has for its object to provide a simple, efficient, and durable machine of this character by or from which a cotton-gin, a grist or saw mill, or other machinery may be driven.

The invention consists in certain novel features of construction and combination of parts of the power mechanism, all as hereinafter described and claimed.

Reference is to be had to the accompanying drawings, forming a part of this specification, in which similar letters of reference indicate corresponding parts in all the figures.

Figure 1 is a side elevation of my improved horse-power. Fig. 2 is a detail cross-section thereof, taken on the line 1 1 in Fig. 3. Fig. 3 is a vertical longitudinal sectional elevation of the horse-power, taken on the line 2 2 in Fig. 5, and shows also the gearing and sweep to which the animal or animals will be hitched, and the belt leading therefrom to the horse-power proper. Fig. 4 is a detail transverse vertical section of the horse-power, taken on the line 3 3 in Fig. 5. Fig. 5 is a plan view of the horse-power, partly broken away. Fig. 6 is a plan view of the tilting weight-boxes and carriage, the carriage being in section on the line 4 4 in Fig. 3; and Fig. 7 is a perspective view of one of the weight-boxes, partly broken away and in section.

I will first describe the horse-power proper and then the master-wheel gearing operated by a sweep, to which one or more horses are hitched, and from which gearing power is transmitted to the horse-power proper, to be made available through it for operating machinery.

The horse-power proper is made with a main frame, A, to the upper central part of which is pivoted by suitable shafts and bearings, $b\ b$, a tilting carriage, B, which has a lengthwise central slot, $b'$, through which passes an upright lever or bar, C, which is fixed to a shaft, D, which is journaled in bearings $d\ d$ at or near the lower part of the main frame, and has fixed to its upper end a head-bar, E, which curves upward each way from the lever C, to which the head-bar is fixed at its center. At the tops of the opposite ends of the tilting carriage B are journaled anti-friction rollers or wheels $e\ e'$, onto which the opposite ends of the head-bar E ride alternately during the operation of the machine.

To the lower end or short arm of the lever C is connected pivotally one end of a pitman or rod, F, the other end of which is connected to the crank $g$ of a shaft, G, which is journaled in the frame A or in an end extension thereof, and to which shaft is fixed a pulley or wheel, $g'$, from which a belt, $g^2$, will lead to a pulley on a line-shaft, for imparting motion to connected machinery, or directly to a pulley on a cotton-gin or grist or saw mill to operate such machines.

To the upper end or long arm of the carriage-lever C are pivoted the inner ends of two pairs of metal straps, $h\ h$ and $i\ i$, which project in opposite directions from the lever along the carriage B. To the outer ends of the straps $h$ is connected a box, H, carrying a series of weights, H', and to the outer ends of the straps $i$ is connected a box, I, carrying a series of weights, I'. These boxes H I are provided with an axle and wheels, J, on which they are free to roll for a limited distance along the floor of the tilting carriage. Metal plates $j$, fixed to the sides of the weight-boxes, cover their wheels and present small faces to the sides of the carriage to avoid excessive friction thereon. The boxes are preferably provided with series of holes K in their sides, to receive a cross-bar, $k$, which thus may be adjusted behind the last weight in the boxes to hold all the weights used therein snugly to each other, and at the outer ends of the weight-boxes to avoid shifting or noisy rattling of the weights and utilize their gravity to the best advantage. As the opposite ends of the carriage B tilt downward, they strike buffer-springs L L, fixed to opposite cross-timbers $a\ a$ of the frame A, to relieve the shock and prevent noise.

The weight-box carriage B is tilted to utilize the gravity of the weight-boxes by means of a longitudinally-ranging cross-head, M, which carries rollers or anti-friction wheels $m\ m'$ at its opposite ends, which act on opposite end parts of the curved head-bar E. The cross-head M is fixed to the laterally-extending top bar, n, of a lever, N, which is fulcrumed at n' to the upper part and one side of the frame A, and is adapted to rock or oscillate like a pendulum at one side of the frame. The lower end of the lever N is pivotally connected to one end of a pitman, O, which is connected at its other end to an eccentric or wrist pin, o, on a wheel, P, which is fixed to a shaft, R, journaled to the frame A or to an end extension thereof. This shaft carries a pulley, r, from which a belt, S, leads to a driving-pulley, T, on a shaft, t, of the driving-power mechanism shown in Fig. 3 of the drawings. The shaft t carries a pinion, u, which meshes with the crown-toothed master-wheel U, which is fixed horizontally to a vertical shaft, V, journaled in suitable top and bottom bearings, and provided with one or more arms, W, to which one or more animals will be hitched for rotating the shaft, and thereby operating the pendulum-lever N for tilting the weight-box carriage.

The operation of the horse-power proper is as follows: As its shaft R and wheel P are rotated by the power mechanism W V U T S, or by any other suitable or convenient motor, the pitman O will swing the lever N to cause the anti-friction rollers m m' to act alternately on the head-bar E, and thereby tilt the weight-box carriage B, and at the same time rock the lever C, and this lever will, through the pitman F, crank g and shaft G, pulley g', and belt g², give off power to operate any connected machinery. In further explanation, we will suppose that the parts are in the relative positions shown in Fig. 3 of the drawings, and so that the next time the lever N is shifted the roller m will then press on the head-bar E. This pressure will be communicated through the roller e to the higher end of the weight-box carriage B and cause said box to tilt over to the position shown in Figs. 1 and 5 of the drawings. As the carriage is thus tilted it inclines the weight-boxes H I and causes them to run by their gravity to the lower end of the carriage, and in so doing the boxes will swing the lever C over to the position shown in Figs. 1 and 5, and thereby operate the pitman F, wheel g', and belt g² to drive the connected machinery. On the return-stroke the roller m' will act on the head-bar E, and this bar will act on the roller e' to tilt the carriage B back to the position shown in Fig. 3 of the drawings, and thereby cause the weight-boxes to travel back again toward the lower end of the carriage and swing the lever C back to its first-described position, and thus complete one revolution of the shaft G, and so on alternately, the shaft making one revolution for every two tilting movements of the carriage, which strikes the buffers L L alternately on its descent, as hereinbefore stated.

It will be noticed that the entire gravity of all the weights in both the carriage-boxes H I, which are connected to the long arm of the lever C, will be available the moment the carriage tilts out of level either way to give positive movements to the lever, and with a force depending on the number or gravity of the weights in the carriage-boxes; hence the force of movement of the power-transmitting lever C will vary with the number or gravity of the weights, and may be increased by placing more weights in the boxes or decreased by removing weights from the boxes; hence the amount of power given off by the lever C may be regulated or varied at will by using a larger or smaller number of weights in the tilting-carriage boxes.

The pitman F is provided with series of holes f at each end, and the lower end of the lever N and the outer end of the pitman O are also provided with series of holes to receive connecting-pins, whereby the extent of tilting movement of the weight-box carriage may also be controlled, and this feature of adjustment, in connection with the varying number of weights which may be used in the carriage-boxes, makes it possible to closely regulate the amount of power which will be imparted to the shaft G and connected machinery.

Having thus described my invention, what I claim as new, and desire to secure by Letters Patent, is—

1. The combination, in a horse-power machine, of a frame, a tilting carriage thereon, a lever fulcrumed on the frame, connections from said lever to machinery to be driven thereby, a weight box or boxes held to the lever and traveling on the carriage during its tilting movement, and mechanism for rocking the lever, and thereby tilting the carriage, substantially as described, for the purposes set forth.

2. The combination, in a horse-power machine, of a frame, a tilting carriage thereon, a lever fulcrumed on the frame, connections from said lever to machinery to be driven thereby, a weight box or boxes held to the lever and traveling on the carriage during its tilting movement, a longitudinally-ranging head-bar on the lever tilting the carriage as the lever is rocked, a lever fulcrumed on the frame and carrying a cross-head acting on the head-bar of the carriage-tilting lever, and mechanism connected to the lever having the cross-head for operating it from an adjacent horse-power or other motor, substantially as described, for the purposes set forth.

3. The combination, in a horse-power machine, of a frame, a tilting carriage, B, thereon, provided with a floor-slot, b', a lever, C, fulcrumed on the frame and projecting through said slot, two boxes, H I, carrying weights and held to the lever C to travel on the carriage B, connections from the lever C to machinery to be driven, and mechanism for rocking the lever and tilting the carriage, substantially as herein set forth.

4. The combination, in a horse-power machine, of a frame, a tilting carriage, B, thereon, provided with a floor-slot, b', two boxes, H I, carrying weights and held to the lever C to travel on the carriage B, a pitman, F, connected to the lever and to a cranked driving-shaft, a head-bar, E, on the lever, and a lever, N, fulcrumed to the frame and provided with a cross-head, M, operating on the head-bar E for rocking the lever C and tilting the weight-box carriage, substantially as herein set forth.

5. The combination, in a horse-power machine, of a frame, a tilting carriage thereon, a lever fulcrumed on the frame, connections from said lever to machinery to be driven, a weight box or boxes held to the lever and traveling on the carriage during its tilting movements, a head-bar, E, on the lever, a lever, N, fulcrumed on the frame and provided with a cross-head, M, acting on the head-bar E, and a pitman, O, connected to the lever N and to power mechanism driven from an adjacent motor, substantially as herein set forth.

6. The combination, in a horse-power machine, of a frame, a tilting carriage thereon provided with anti-friction wheels $e\ e'$ at opposite ends, a lever, C, fulcrumed to the frame and connected to machinery to be driven, and provided with a curved head-bar, E, acting on the carriage-wheels $e\ e'$ to tilt the carriage, substantially as herein set forth.

7. The combination, in a horse-power machine, of a frame, a tilting carriage thereon, a lever, C, fulcrumed to the frame and connected to machinery to be driven, a head-bar, E, on said lever acting on the carriage to tilt it as the lever is rocked, a lever, N, fulcrumed on the frame and operated from an adjacent power, a cross-head, M, on said lever N, provided with anti-friction wheels $m\ m'$, acting on the head-bar of the lever C, substantially as herein set forth.

8. The combination, in a horse-power machine, of a frame, a tilting carriage thereon, a lever fulcrumed on the frame, connections from said lever to machinery to be driven, a weight box or boxes held to the lever and traveling on the carriage as it is tilted, mechanism for rocking the lever and tilting the carriage, and spring-buffers on the frame relieving the shock of the tilting movements of the carriage, substantially as herein set forth.

9. The combination, in a horse-power machine, of a frame, a tilting carriage thereon, a lever fulcrumed on the frame, connections from said lever to machinery to be driven, a weight box or boxes connected to the lever and mounted on wheels and traveling on the carriage during its tilting movement, and mechanism rocking the lever and tilting the carriage, substantially as herein set forth.

ALLEN SAMPSON.

Witnesses:
ABRAHAM LEVI,
H. S. CUNNINGHAM,
G. A. LEVI.